May 5, 1970     H. H. CARY     3,510,226

POLARIMETER WITH REGULATED PHOTOMULTIPLIER TUBE

Original Filed July 9, 1964     4 Sheets-Sheet 1

HENRY H. CARY
INVENTOR.

BY
ATTORNEY

May 5, 1970 H. H. CARY 3,510,226
POLARIMETER WITH REGULATED PHOTOMULTIPLIER TUBE
Original Filed July 9, 1964 4 Sheets-Sheet 2
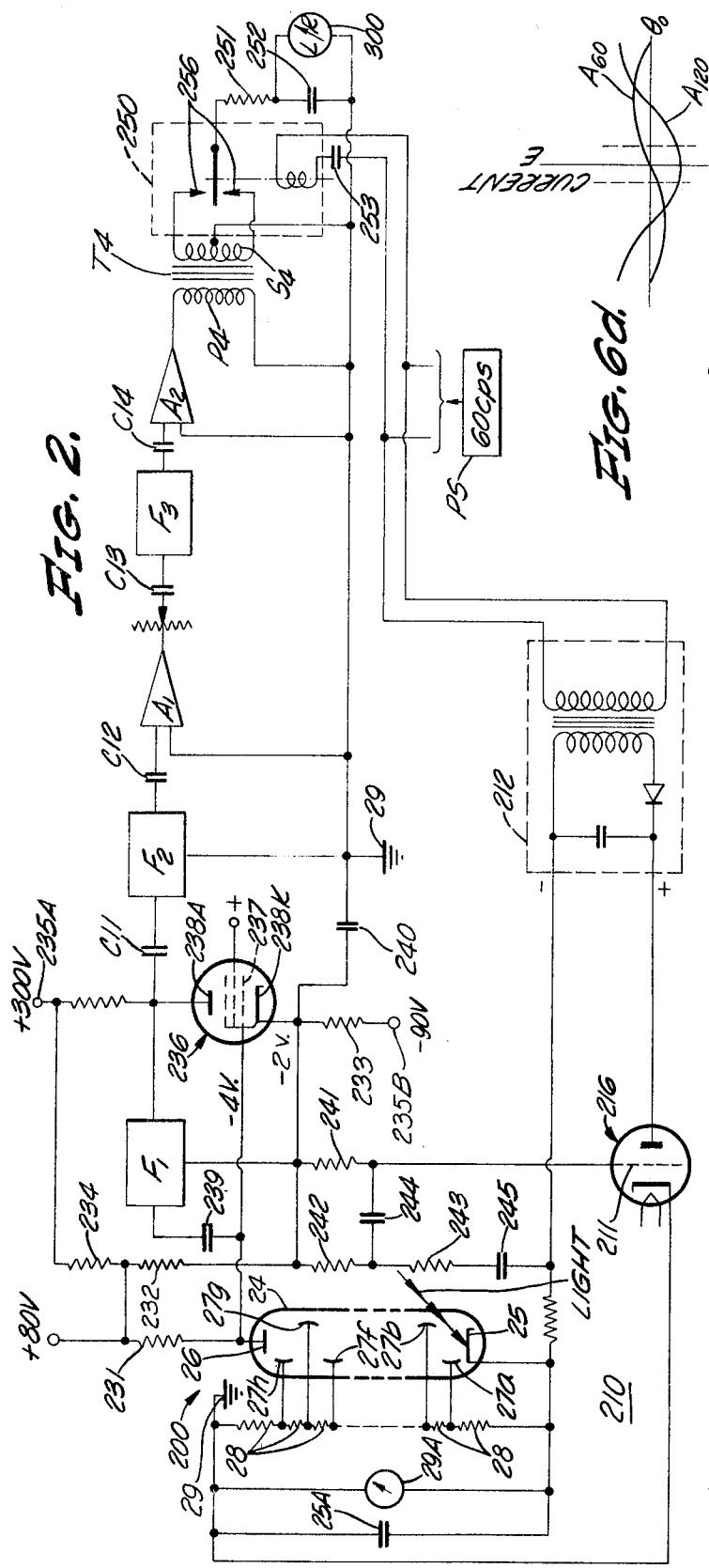
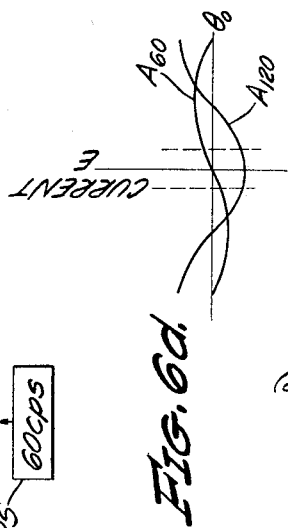
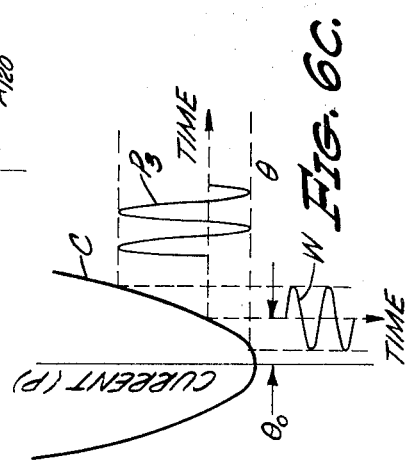
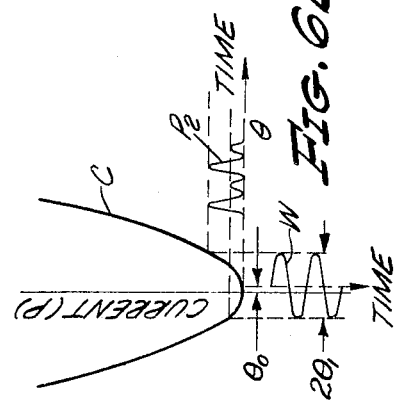
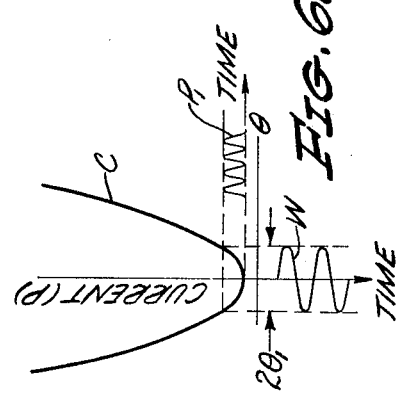
HENRY H. CARY
INVENTOR.
BY
ATTORNEY

HENRY H. CARY
INVENTOR.

BY Reed C. Lawlor
ATTORNEY

HENRY H. CARY
INVENTOR.

BY Reedle Lawlor
ATTORNEY

United States Patent Office 3,510,226
Patented May 5, 1970

3,510,226
POLARIMETER WITH REGULATED
PHOTOMULTIPLIER TUBE
Henry H. Cary, Pasadena, Calif., assignor, by mesne assignments, to Cary Instruments, Monrovia, Calif., a corporation of California
Continuation of application Ser. No. 381,474, July 9, 1964. This application Feb. 17, 1969, Ser. No. 802,734
Int. Cl. G01n 21/40
U.S. Cl. 356—117
13 Claims

ABSTRACT OF THE DISCLOSURE

In this polarimeter, the plane of polarization of the beam that has been transmitted through a sample is angularly oscillated by means of a Faraday coil subjected to an alternating magnetic field of fundamental frequency. The gain of the photomultiplier tube that detects the beam is automatically regulated by the average current output of the tube or in accordance with the amplitude of a component other than that of fundamental frequency, in order to provide an output signal which is proportional to the angular displacement of the beam from a reference position substantially independently of the average intensity of the beam.

---

This application is a continuation of my prior application Ser. No. 381,474 filed July 9, 1964, which in turn was a continuation-in-part of my prior application Ser. No. 772,992 filed Nov. 10, 1958, both of which have been abandoned.

This invention relates to polarimetry and, more particularly, to improvements in methods and apparatus for accurately determining the amount of rotation of a plane-polarized beam of light as the beam is transmitted through a sample.

Although this invention may be employed in other wavelength ranges, it is especially applicable to radiation in the visible and near-visible regions. For this reason, it is described herein with particular reference to electromagnetic radiation that is called light. It is to be understood, of course, the term "light" is not restricted to the visible range but includes radiation in both the ultraviolet and infrared ranges.

It is well known that when a plane-polarized beam of electromagentic radiation, such as visible light, is transmitted through an optically active material, whether it be liquid, solid, or gas, the plane of polarization is rotated by the material. Furthermore, irrespective of whether a material is optically active or not, if it is immersed in a magnetic field having a component of the magnetic field along the line which the light is transmitted through the material, the plane of polarization is rotated and the part of the angle of rotation that is caused by the magnetic field is proportional to the strength of the magnetic field component and to the length of the light path through the material. The constant of proportionality is known as the Verdet constant. This effect is known as the Faraday effect. The formula for such rotation is usually given in the form $$\theta = (\alpha + VH)L \qquad (1)$$

where $\theta$ = the angle of rotation of the plane of polarization caused by the material while subjected to the influence of the magnetic field
$\alpha$ = a measure of the optical activity
$H$ = strength of the component of the magnetic field along the path of the beam
$L$ = length of the path transversed by the beam in the material
$V$ = Verdet constant.

The Verdet constant $V$ and the term $\alpha$ are functions of the wavelength and also of the nature of the material through which the radiation is transmitted. The term $\alpha$ is zero for an optically inactive material.

In this description, the term "polarization-rotation effect" refers either to the rotation of the plane of polarization produced because of the optical activity of a material in the absence of a magnetic field or to the rotation of the plane of polarization produced when the material is immersed in a magnetic field having a component along the direction of travel of electromagnetic radiation through the material. Considerable industrial and scientific use has been made of the Faraday effect in the study of the polarization-rotation characteristics of materials.

In one system which has been employed in the past, a plane-polarized beam has been transmitted through a sample and the sample has been subjected to the influence of a magnetic field to aid in the determination of the polarization-rotation characteristics of the sample. In another system, a first cell, including a test sample free of any magnetic field, has been placed at one point along a path of the beam, and a Faraday cell has been placed at another point along the beam to rotate the plane of polarization of the beam by a measured amount to aid in determining the amount of rotation to which the beam is subjected in its transmission through the sample. The term "Faraday cell" is employed to refer to a device that includes a coil known as a Faraday coil that is wrapped around a Faraday core such as a solid rod or such as a chamber containing a liquid or gas. In such a cell, the core of a material having a substantial Verdet constant.

In such systems, tests are generally made by employing either a monochromatic beam of radiation or at least a beam in which only a narrow band of wavelengths is transmitted through the material. This is done because of the fact that the polarization-rotation characteristics of materials vary with wavelength. In either of the two types of systems just mentioned in which use is made of the Faraday effect, a beam of radiation is directed into a polarizer such as a Nichol prism or a sheet of "Polaroid." Part of that fraction of the beam which is plane-polarized in a direction selected by the polarizer is transmitted thereby, the remainder of the beam being eliminated by the polarizer either through absorptioin or redirection, thus producing a plane-polarized beam. The plane-polarized beam is ahen transmitted through the Faraday cell and then through an auxiliary sample cell if one is employed and then through an analyzer to a photosensitive element that responds to the intensity of light impinging thereon.

In the art of polarimetry, a polarizing element that is located between a source of radiation and the sample under investigation, and that transmits, along a predetermined path, only radiation that is polarized in a predetermined plane, is called a polarizer. Also, in this art, a polarizing element that is located between the sample under investigation and some means that responds to the intensity of light, is called an analyzer. Commonly, a polarizer and an analyzer may be in the form of a Nichol prism or a sheet of plane-polarizing material, such as that which is sold under the name "Polaroid."

Such a polarizing element generally possesses two principal planes, one of which is here referred to as the polarizing plane. The latter term is employed here to refer to the plane in which a beam of light is plane polarized after passage through the element along a selected path. When a polarizer and an analyzer have their polarizing planes perpendicular to each other, they are said to be crossed. In such a case, when no element producing polarization-rotation is located between the polarizer and the analyzer, the beam transmitted through them has a minimum intensity and the polarizer and analyzer are said to be in their extinction positions. Usually some light is transmitted through crossed elements even in the extinction position for reasons which will be mentioned hereinafter.

This invention deals particularly with improvements in polarimeters in which a polarizer and an analyzer and an intervening sample are located on an optical axis along which a beam of light is transmitted and in which the polarizer and the analyzer are near or at their extinction position. In a particular embodiment of this invention, a Faraday cell is also located on the optical axis between the polarizer and the analyzer, and the Faraday coil is supplied with an alternating current of predetermined frequency and also with a direct current.

In a polarimeter of the type to which this invention applies, the average angle of rotation of the plane of polarization of the polarized beam being transmitted to the analyzer can be adjusted by a variable amount by varying the direct current through the Faraday coil. At the same time, the application of alternating current to the Faraday coil causes the angle of rotation of the beam to oscillate about this average value. With this arrangement, when the direct current through the Faraday coil is established at a value near the extinction point, the intensity of illumination striking the photosensitive element fluctuates periodically in a regularly recurring manner. It has been found that under such conditions, the intensity of the illumination alternates at both the fundamental frequency and at twice that frequency. Furthermore, it has been found that the amplitude of the component of intensity at the fundamental frequency is proportional to the deviation of the rotation angle from the extinction value and, further, that near the extinction value, the average intensity of illumination is substantially independent of that deviation.

A photosensitive element is employed to detect the resultant fluctuations in intensity of radiation transmitted through the spectropolarimeter. Because of the manner in which the intensity of illumination striking the photosensitive element varies as a function of time and for other reasons, the current produced by the photosensitive element includes a direct-current component, an alternating-current component of fundamental frequency, and also a secod harmonic component. For ay given intensity of radiation of fixed wavelength entering the analyzer, the alternating-current component of fundamental frequency is substantially proportional to the deviation of the mean position of the plane of polarization of the light from the extinction position at any given wavelength. The DC current component and the second harmonic component, however, have magnitudes that do not depend, at least not to such an extent, upon the deviation of the plane of polarization of the beam from the extinction position. However, the magnitudes of all three current components depend upon the intensity of the light beam incident upon and transmitted through the analyzer. Additionally, they depend on the sensitivity of the photosensitive element.

Certain difficulties arise in such a polarimeter because of the fact that the intensity of light reaching the analyzer and hence the photosensitive element depends upon the light absorption coefficient of the sample undergoing tests, which in turn is subject to large variations. Furthermore, the response of the photosensitive element is subject to extreme variations detected. In this invention compensation or correction is made for such changes in intensity, absorption coefficient and response.

The main purpose of this invention is to render the AC output of the photosensitive element at fundamental frequency proportional to the deviation from the extinction condition irrespective of the average intensity of the light incident on the photosensitive element and independently of the sensitivity of the photosensitive element at least at any one wavelength.

In accordance with this invention, the sensitivity of the photosensitive element is adjusted automatically in response to changes in the DC component of current produced by it to compensate for variation of average intensity in the radiation incident upon the photosensitive element and also for variations in the sensitivity of the photosensitive element itself so as to produce an overall system which possesses a sensitivity at the fundamental frequency that is substantially independent of such variations. In the embodiment of the invention specifically described herein, these fluctuations and variations in sensitivity of the photosensitive element and in light beam intensity are used to generate changes in a bias signal which is applied to a current regulator in the power supply for the photosensitive element to control the current of the power supply by the regulator as an inverse function of the average current. By controlling the bias signal in this manner, the gain of the photosensitive element varies inversely as the light intensity and sensitivity thus rendering the AC current substantially independent thereof or at least less dependent thereon at least at any one wavelength.

The foregoing and other features of this invention and various advantages thereof will become apparent from the following description taken in connection with the accompanying drawings in which:

FIG. 2 is a more detailed partially schematic and partially block diagram of the regulator of this invention;

FIGS. 6a, 6b, 6c and 6d are a series of graphs employed in explaining the operation of this invention;

GENERAL DESCRIPTION

Figure 1:
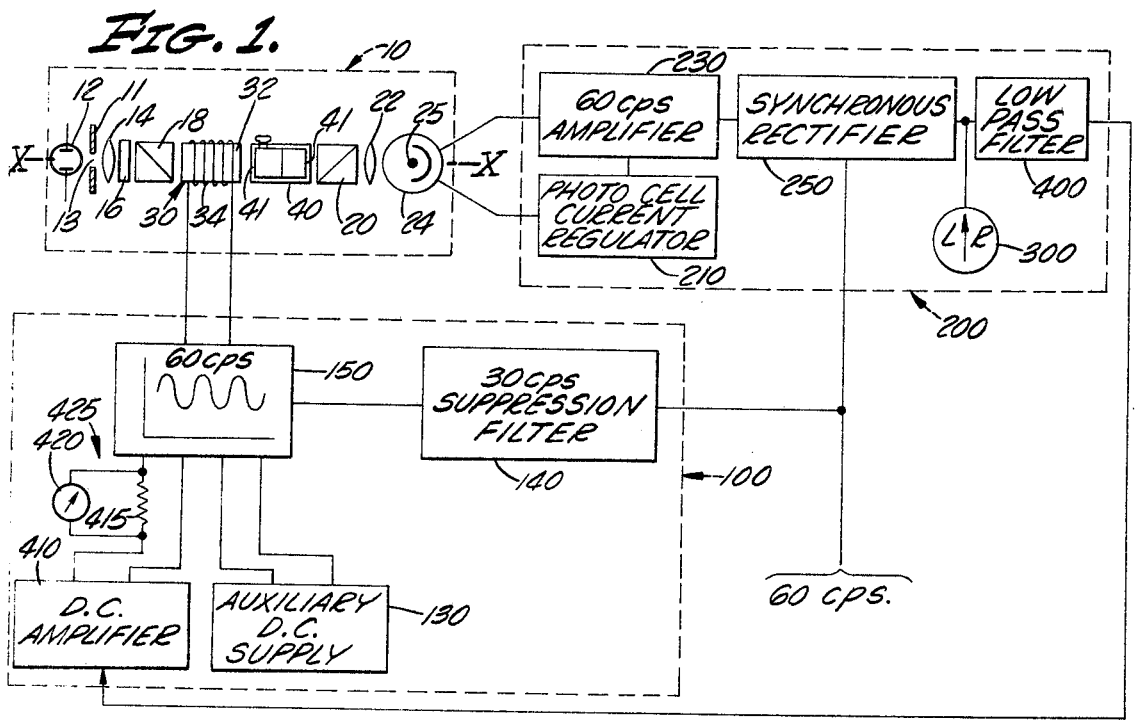
FIG. 1 is a partially schematic and partially block diagram of a spectropolarimeter incorporating this invention.

In the self-balancing polarimeter 10 illustrated schematically in FIG. 1 and embodying features of this invention, a source of radiation, such as a mercury lamp 12, a diaphragm 11 having an aperture 13, a lens 14, an optical filter 16, a polarizer 18, a Faraday cell 30, a sample cell 40, an analyzer 20, a second lens 22, and a photosensitive element in the form of a photomultiplier tube 24, are arranged in the order named along the optical axis X—X of the device. This polarimeter also includes a current source 100 that im employed to vary the intensity H of the component of the magnetic field along the optical axis X—X. In addition, a light-intensity measuring system 200 is employed to measure the intensity of certain fluctuating components of the light incident upon the photomultiplier 24.

The source of radiation 12 may be in the form of a mercury lamp or other gaseous discharge lamp that emits a line spectrum. The lens 14 is a spherical lens which has its principal focus at the aperture 13. The lens 14, therefore, collimates the radiation emerging from the source 12 causing light emerging from any point of the aperture 13 to be transmitted as a so-called "plane-parallel" beam along the optical axis X—X. In order to confine the beam to a small angle, the aperture 13 is made small.

The light filter 16 is of a type suitable for transmitting through the polarimeter only a single monochromatic component of the line spectrum of the source 12. For example, to transmit the green Hg line having a wavelength of 5461 A., the filter may consist of three Corning filter plates Nos. 3486, 4308, and 5102. Each of the polarizing elements 18 and 20 may be in the form of a Nichol prism or a sheet polarizing material, such as Polaroid.

Alternatively, the light source may be in the form of a continuous-spectrum source and a monochromator which provides radiation of any arbitrarily selected wave length over a wide wavelength range.

The light source 12, lens 14, filter 16 or other monochromator, and polarizer 18 constitute a source of plane-polarized radiation that travels as a collimated beam along the axis X—X toward the Faraday cell 30 and the remaining elements of the polarimeter. When such a collimated beam is directed into such a polarizer, the emergent beam is very nearly plane polarized in the polarizing plane of the polarizer. In any polarized beam, the magnetic vector of the radiation lies in the plane of polarization and the electric vector is perpendicular thereto.

In the polarimeter of this invention, plane polarized light of selected wavelength is transmitted through a sample to an analyzer and the photocell. The plane of polarization is rotated by the sample. Additionally, an alternating current applied to the coil of the Faraday cell causes the plane of polarization to oscillate angularly about a means position. The resultant AC current generated in the photosensitive element is amplified and is either measured to determine the rotation produced by the sample or is employed to rotate the polarization plane of the beam by an angle equal and opposite to that introduced by a sample placed in the path of the beam. Difficulties arise in such a system because the sensitivity of the system depends upon the sensitivity of the photosensitive element, which varies with wavelength, and also upon the intensity of the beam entering the analyzer and this intensity in turn depends upon the intensity of the monochromatic radiation transmitted from the monochromator or other light source and partly upon the density or light absorption of the sample at the wavelength of such radiation. This invention relates primarily to the automatic regulation of the gain of the photosensitive element as a function of the average signal being generated thereby in order to compensate for changes in signal strength that otherwise occur because of changes in the absorption coefficient of the sample, changes in intensity of the light issuing from the filter or monochromator, changes in the absorption coefficient of the analyzer, Faraday cell, polarizer, or lenses, or changes in the response of the photosensitive device itself. The invention is applicable to a polarimeter operating at fixed wavelength and also to a spectropolarimeter in which the wavelength is varied.

For the purposes of initial explanation, consider the action at a single wavelength and assume that the polarization plane of the polarizer 18 is horizontal and the polarization plane of the analyzer 20 is vertical, that is, that the polarizer and analyzer are crossed. Under these conditions, the electric vector of the radiation emerging from the polarizer 18 lies in a vertical plane, that is, perpendicular to the plane of polarization of the polarizer and the magnetic vector lies in a horizontal plane.

The plane-polarized beam is then transmitted through the core 32 of the Faraday cell. The core may be in the form of a solid rod composed of some material transparent to the radiation employed, or it may be in the form of a liquid-containing cell having parallel end plates. When the core 32 consists of a solid rod, such as glass, the end plates are plane and parallel. When the core 32 is in the form of a fluid-containing chamber, the end walls are in the form of parallel flat plates of transparent material.

As the plane-parallel polarized beam is transmitted through the Faraday core 32, the plane of polarization is rotated through an angle $\theta'_0$ that depends upon the nature of the material in the core, the length of the path of travel of the light through the core, and the strength H of the magnetic field in the core along the optical axis X—X. The plane of polarization is rotated either clockwise or counterclockwise, depending upon the direction of the magnetic field and the nature of the material.

In the Faraday cell illustrated in FIG. 1, the magnetic field H is produced by passing an electric current through a Faraday coil 34 which is wound around the core 32 concentrically with the optical axis X—X. For this reason, the rotation angle is proportional to the current. In this embodiment of the invention, the current supplied to the Faraday coil 34 consists of both an AC component $I_{AC}$ of fundamental frequency $(f)$ such as 60 c.p.s. and a DC component $I_{DC}$. Thus the current in the coil may be represented by the equation $$I = I_{DC} + I_{AC} \sin \omega t \quad (2)$$

where $$\omega = 2\pi \quad (3)$$

When such a current is applied to the Faraday coil 34, the plane of polarization is rotated through an average angle $(\theta'_0)$ which is proportional to the DC component $I_{DC}$ and the angle of rotation varies sinusoidally through an incremental angle having an amplitude $\theta_1$ which is proportional to the amplitude of the alternating current $I_{AC}$. Thus, the angle of rotation of the plane of rotation produced by the Faraday cell 30 is given by the equation $$\theta = \theta'_0 + \theta_1 \sin \omega t \quad (4)$$

The rotated plane-polarized beam emerging from the Faraday cell 30 is then transmitted through the sample cell 40 where it is further rotated. The sample cell 40 is in the form of a vessel having flat parallel end plates 41 of uniform thickness. If the liquid contained in the sample cell is active, the plane of polarization is rotated by a further angle $\theta''_0$. Thus, the plane of polarization of the light that emerges from the sample cell is given by the following formula:

$$\theta = \theta_0 + \theta_1 \sin \omega t \quad (5)$$

where $$\theta_0 = \theta'_0 + \theta''_0 \quad (6)$$

Thus, the average position of the plane of polarization of light emerging from the sample cell 40 is displaced by an angle $\theta_0$ from the vertical plane. However, the actual plane of polarization varies over the range between the extreme values $\theta_0 - \theta_1$ and $\theta_4 + \theta_1$, varying in a sinusoidal manner with an amplitude $\theta_1$.

The plane-polarized beam that has been rotated through the time-average angle $\theta_0$ is now directed into the analyzer 20. The intensity of the beam transmitted through the analyzer depends upon the angle between the polarizing plane of the analyzer and the plane of polarization of the beam. If these two planes coincide, the plane-polarized beam is transmitted through the analyzer with minimum attenuation, there being some loss due to reflection and to absorption of light by the analyzer. But if the polarizing plane of the analyzer is perpendicular to the plane of polarization of the beam, maximum attenuation of the beam occurs. Generally speaking, if the polarizing plane of the analyzer is inclined to the plane of polarization of the beam, the attenuation depends on the angle between these two planes. More particularly, the transmission coefficient T of the polarizer and analyzer may be represented by the following formula:

$$T = T_0 + T_1 \sin^2 \theta \quad (7)$$

where $T_0$ = minimum transmission coefficient of the polarizer-analyzer combination $T_0 + T_1$ = maximum coefficient of the polarizer-analyzer combination $\theta$ = angle between plane of polarization of the beam incident on the analyzer and the polarizing plane of the analyzer If both the polarizer 18 and the analyzer 20 are stationary, then, since the angle of rotation of the beam is varied by the Faraday cell, the intensity of radiation emerging from the analyzer 20 is thereby modulated.

The manner in which the current generated by the photosensitive element 24 varies for different average angles $\theta_0$, may be explained readily by reference to the graphs in FIGS. 6a, 6b, and 6c. In the upper half of all three of these graphs, a curve C, which is of approximately parabolic shape, represents the manner in which the current output of the photomultiplier tube 24 varies as a function of the angle $\theta$ by which the plane of polarization of the beam impinging on the analyzer deviates from the extinction position so long as the angle $\theta$ is smaller. In these graphs it will be noted that even when the angle $\theta$ is zero, some current is produced by the photomultiplier tube 24 and that as the angle $\theta$ increases, the current also increases but as the square of the deviation $\theta$. In the lower part of each of the FIGS. 6a, 6b, and 6c, a curve W is shown that represents the manner in which the angle $\theta$ varies as a function of time. In FIG. 6a it is assumed that the average deviation $\theta_0$ of the beam from the extinction position is equal to zero. In FIG. 6b it is assumed that the average deviation is less than the amplitude of the alternating component of the deviation. In FIG. 6c it is assumed that the average is greater than the amplitude of the alternating component of the deviation. In all three cases represented in FIGS. 6a, 6b, and 6c, the amplitude of the current generated by the photomultiplier tube 24 in response to the beam of light incident thereon, is unidirectional, but fluctuates, with alternating current components superimposed upon a DC component. In the case of FIG. 6a which corresponds to an extinction condition, the AC component of the photomultiplier current P1 consists substantially entirely of a second harmonic, or 120 c.p.s., component. In the case of FIG. 6b which corresponds to a deviation from the extinction condition, the AC component of the photomultiplier current P2 consists of a fundamental AC component of 60 c.p.s. superimposed on a second harmonic AC component of 120 c.p.s. In the case of FIG. 6c which corresponds to wide deviation from the extinction condition, the AC component of the photomultiplier current P3 consists primarily of a 60 c.p.s. component and odd harmonics thereof but in addition of a 120 c.p.s. component and other even harmonics.

The manner in which the amplitude of the fundamental and the second-harmonic components vary with the average angle of rotation is indicated in the graph of FIG. 6d. There it will be noted that the magnitude of the 60 c.p.s. component is proportional to the average angle of rotation $\theta_0$ for small values of $\theta_0$. In fact, the sign, or polarity, or phase of this current is reversed as $\theta_0$ changes from positive to negative. In this graph the curve $A_{120}$ illustrates how the magnitude of the 120 c.p.s. AC component of the current changes. This curve it will be noted, is nearly flat so long as $\theta_0$ is small.

In the practice of this invention under the most important conditions, $\theta_0$ is very small and the amplitude of oscillation of the angle of rotation is made only a degree or so. Under such conditions $$A_{60} \ll A_{120} \qquad (8)$$

that is, the amplitude of the 60 c.p.s. component is very small compared to the amplitude of the 120 c.p.s. component of the alternating current part of the current generated by the photomultiplier tube 24. Also, under this condition $$\theta_0 \ll \theta_1 \qquad (9)$$

In practice, in accordance with this invention, the measuring system 200 is made selectively responsive to the 60 c.p.s. component and selectively non-responsive to the 120 c.p.s. component and DC component. With such a measuring system, the null or extinction point may be easily and accurately detected.

The output of the measuring system 200 may be applied directly to a meter 300, or it may be fed through a low-pass filter 400 to the rotation compensating unit 100, or both. If the feedback to the compensating unit 100 is disconnected, the meter 300 may be calibrated to read deviation of the plane of polarization of the beam from the polarization plane of the analyzer 20. In such a case, by regulating the sensitivity of the photosensitive element in accordance with this invention, the indication of the meter 300 may be made more nearly proportional to the deviation. But if the connection to the polarization compensating network 100 is utilized, the self-balancing action will be rendered more nearly uniform over a wide range of intensity of the beam that enters the analyzer 20.

It can be shown that when the polarizer 18 and analyzer 20 are stationary, then, since the angle of rotation of the beam is varied by the Faraday cell, the intensity of radiation emerging from the analyzer 20 is thereby modulated in accordance with the formula $$L = L_0(T_0 + T_1 \sin^2 [\theta_0 + \theta_1 \sin \omega t]) \qquad (10)$$

From the foregoing equation, it can be shown that approximately $$L = L_0 \left[ \left( T_0 + T_1\theta_0^2 + \frac{T_1}{2}\theta_1^2 \right) + 2T_1\theta_0\theta_1 \sin \omega t - \frac{T_1}{2}\theta_1^2 \cos 2\omega t \right] \qquad (11)$$

In this Equation 11, the set of terms in parentheses is the average, or DC, component of the light flux, the next to the last term represents a fundamental-frequency component, while the last term is a second-harmonic component.

In the present invention the first harmonic, or fundamental, term is detected. This detection is performed by use of a filter in the measuring system which renders the measuring system selectively responsive to signals of fundamental frequency. The component of the light flux of that frequency at the photosensitive element is proportional to the fourth term of Equation 11. That is, it is proportional to $L_0T_1\theta_0\theta_1$.

In this invention, the gain of the photomultiplier tube is varied inversely as a function of the average current flowing therethrough rendering its fundamental-frequency output substantially proportional to the deviation angle $\theta_0$ As used herein, the term average current refers to the average over a period corresponding to that of the components of fundamental frequency or a multiple thereof. In other words, when the fundamental frequency is 60 c.p.s. the average output current of the photocell is the time average taken over a period of ⅟₆₀ of a second or some multiple thereof. In practice, the value of the deviation angle $\theta_0$ is small compared with the amplitude $\theta_1$ of the oscillation of the plane of polarization. In such a case, the average DC current is substantially independent of the deviation $\theta_0$. Thus, by automatically regulating the gain of the photomultiplier tube to maintain the average output current substantially constant, the output of the photomultiplier is linearized with respect to the deviation.

With further reference to the form of this invention illustrated in FIG. 1, the DC current supplied to the Faraday cell 30 is regulated automatically in response to the output of the synchronous rectifier 250. In the polarimeter illustrated there, the output of the synchronous rectifier 250 is first passed through a filter 400 which is designed to produce a direct current at its output, free from any substantial fluctuations at 30 c.p.s. or higher that might otherwise exist in the output of the synchronous rectifier 250. The filter 400 may be of the low-pass type, having a sharp cutoff well below 30 c.p.s. More particularly, since the dominant frequency of any alternating current present in the output of the synchronous rectifier 250 is of a second-harmonic frequency, in this case 120 c.p.s., the low-pass filter 400 has a cutoff below that frequency. To avoid any disturbances that might be due to any residual amount of current or fundamental frequency, or 60 c.p.s., it is much better if the cutoff of the low-pass filter 400 is below 60 c.p.s. It is particularly important that the cutoff be below 60 c.p.s. if the polarimeter is likely to experience large deviations of the average rotation angle $\theta_0$. Furthermore, it is desirable to make the cutoff of the low-pass filter 400 below 30 c.p.s. to avoid any regenerative effects at that frequency. For best results, however, in practice the cutoff frequency of the low-pass filter 400 is made very much lower than any of the aforementioned frequencies in order to make the loop gain of the system less than 1 at any such frequencies. A suitable low-pass filter in a system in which the loop-gain is 100 would be a simple RC filter having a time constant of 1 second or less. When a filter having a one-second time constant is used, the entire system has a response time of about 0.01 second. In the polarimeter illustrated in FIG. 1, current combining circuit 150 receives a DC current from an auxiliary DC supply 130 and a control DC current from the output of DC amplifier 410 which is derived from low-pass filter 400.

Simultaneously, alternating current at 60 c.p.s. is applied to combining circuit 150 through filter 140 which suppresses a 30 c.p.s. component that may be present. By means of combining circuit 150 the direct current supplied from DC supply 130 and DC amplifier 410 and the alternating current at 60 c.p.s. transmitted through 30 c.p.s. suppression filter 140, are applied to Faraday coil 34. A current meter 420 shunted by resistor 415 forms a current sensitive network to measure the current required to produce extinction when a sample is in sample cell 40.

DC amplifier 410 is controlled by the output of low-pass filter 400. The DC amplifier 410 is of a kind which produces no current in its output when no voltage is applied to its input but which produces at its output a current which is proportional to and has the same sign as the voltage applied to its input.

SENSITIVITY REGULATION

In the measuring system 200 specifically illustrated in FIG. 2, the photosensitive element 24 is in the form of a photomultiplier tube having a photocathode 25, an anode 26, and a series of dynodes 27a, 27b . . . and 27h arranged sequentially between the photocathode 25 and ground 29. The photomultiplier tube 24 is energized from a suitable power supply, including the rectifier 212 and the current regulator 216. The photocathode 25 is operated at a large negative potential and the anode 26 is operated at a small negative potential. The current supplied by the rectifier 212 and the regulator 210 flows through a voltage divider comprised of a series of dynode supply resistors 28 to ground 29. The voltage between the photocathode 25 and ground is indicated by a direct current voltmeter 29A. A by-pass capacitor 25A is connected across the dynode supply resistors 28 to minimize the effect of transient voltages that may appear in the output of regulator 210. The current flowing through the anode 26 is applied to a load circuit including a resistor 231, a resistor 232, and a resistor 234. Resistors 232 and 234 form a voltage divider between the positive 300-volt power supply terminal 235A and the cathode 238K of the input pentode 236.

The DC voltage developed across this resistor network by the phototube anode current is applied to the input grid 237 of the pentode 236. The anode 238A of the pentode 236 is also connected by the capacitor 239 through feedback filter F1 to the input grid 237. The cathode 238K of the pentode 236 is connected by a resistor 233 to a negative power supply terminal 235B having a voltage of about −90 volts. A by-pass condenser 240 is connected between the cathode 238K and ground 29.

In effect, the amplifier provided by the pentode 236 and its asociated circuits is a combined DC cathode-follower amplifier and 60 c.p.s. amplifier. Due to the cathode-follower action, the DC voltage present across resistors 231 and 232 appears across the cathode-follower resistor 233. The amplified 60 c.p.s. signal appears between the anode 238A and ground 29.

The DC potential appearing at the cathode 238K is applied to the control grid 211 of a series regulator tube 216. By virtue of this fact, if the DC current flowing through the photomultiplier tube 24 changes for any reason, and the voltage at the anode 26 changes in a corresponding manner, such a change in voltage alters the current flowing through the regulator tube 216. The current flowing through the dynode resistors 28 is changed by the regulator tube 216 in such a direction as to tend to maintain the DC potential of the cathode 238K and, hence, the DC potential of the anode 26 constant.

In operation, the voltage maintained across the resistor 231 is many times larger than the voltage change required on the grid of regulator tube 216 to carry its plate current from cutoff to its maximum value, thus assuring effective regulator action. Likewise, if the average intensity, or the steady of DC component of the intensity, of the light flux falling on the photocathode 25 changes for any reason, the potential of the control grid 211 of the regulator tube 216 also changes in such a way as to tend to maintain nearly constant the potential at the cathode 238K and, hence, the potential at the anode 26. The regulator 210 maintains the DC or steady component of the current flowing through the phototube and, hence, through the resistors 231, 232, and 234, substantially constant, thereby producing in effect a constant direct-current potential at the input of the pentode 236. A stabilizing circuit, comprising resistors 241, 242, and 243, and capacitors 244 and 245, is employed to prevent oscillation of the photomultiplier tube and regulator 210.

Figure 3:
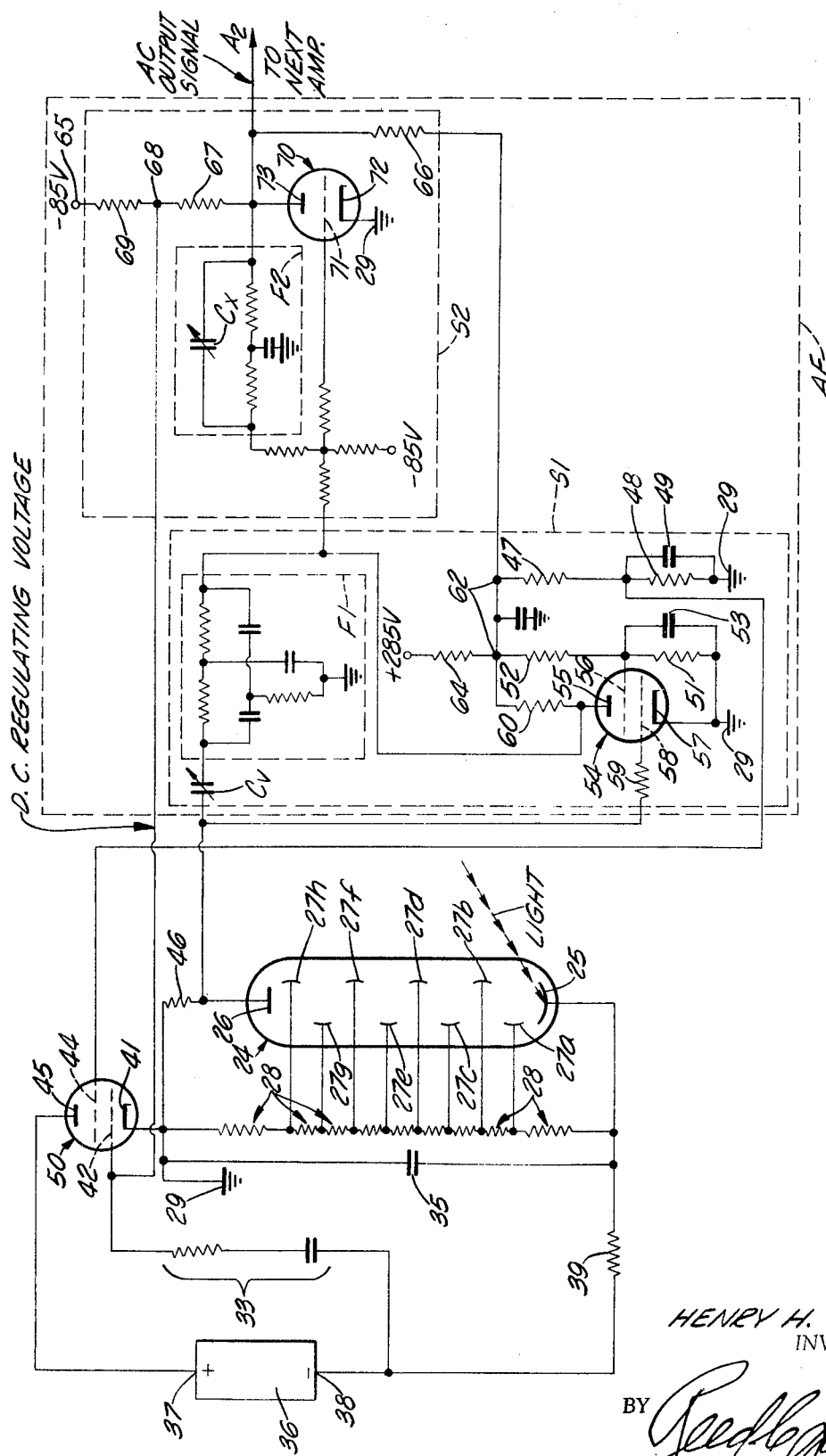
FIG. 3 is a detailed schematic circuit diagram of another embodiment of the invention shown in FIG. 2.

The feedback filter F1 is a notch filter, that has a zero or very nearly zero voltage transmission coefficient at the fundamental frequency of 60 c.p.s. This filter is connected between the anode 238A and the grid 237 of the pentode 236 through a blocking capacitor 239. This filter F1 may be of the parallel-T-type that is illustrated in FIG. 3. Since the notch filter F1 transmits signals at all frequencies except 60 c.p.s., this filter provides negative feedback, for all of the signal except the 60 c.p.s., or more generally the fundamental, components, between the output circuit connected to anode 238A and the input circuit connected to control grid 237 of pentode 236.

The feedback circuit that includes the filter F1 and the capacitor 239 establishes a high negative feedback ratio at all frequencies except at 60 c.p.s. and for direct current and for frequency components near zero. As a result, DC and slowly changing signals are highly amplified to produce an amplified DC or low frequency signal between the cathode 238K and ground 29 and 60 c.p.s. signals are also highly amplified to produce amplified 60 c.p.s. signals between the anode 238A and ground. At other frequencies, the negative feedback ratio established by the filter F1 and capacitor 239 is high, resulting in low amplification of any 30 c.p.s. and any 120 c.p.s. signals. Other signals having higher frequencies than 120 c.p.s. are also little amplified.

As illustrated in FIG. 2 the output of the pentode 236 is supplied to a primary winding P4 of an output transformer T4 through a notch filter F2, a first amplifier A1, a second notch filter F3, and a second amplifier A2 in the order mentioned. The notch filters F2 and F3 are also of the parallel-T type but they are designed to have substantially zero voltage transmission coefficients at the frequency of the second harmonic, namely, 120 c.p.s. As a result, the filters F2 and F3 and amplifiers A1 and A2 transmit the signal of fundamental frequency, that is, the signal at 60 c.p.s., to the output transformer T4 substantially free of any residual second harmonic component that might otherwise appear in the output current of the photomultiplier tube 24. The amplified voltage appearing across the secondary winding S4 of the output transformer T4 is applied to the synchronous rectifier 250, thereby supplying to the meter 300 a DC current that has a magnitude that is proportional to the amplitude of the fundamental frequency, or 60 c.p.s., component of the photomultiplier-tube current. A capacitor 253 in the line that supplies energizing current to the rectifier is employed to synchronize the opening and closing of the rectifier contacts 256 with the passage of the 60 c.p.s. signal on the secondary winding S4 of output transformer T4 through zero.

Because of the fact that the rectifier 250 is of the synchronous type and is supplied with power from the same power source PS that causes the plane of polarization to oscillate, the direction in which the current flows through the meter 300 corresponds to the direction of the average deviation of the plane of polarization of the beam relative to the polarizing plane of the analyzer 20. For this reason, the indications supplied by the zero-center meter 300 not only indicate the deviation of the plane of polarization of the output beam from the extinction position when the DC amplifier 410 is inactive or disconnected, but also the direction of that deviation from the extinction position.

It is apparent from the explanation of the operation of the polarimeter given above that for any particular average angular displacement $\theta_0$ of the beam from the extinction position, the alternating component of the light intensity striking the photomultiplier tube 24 has a constant ratio to the steady or DC component of the light intensity, even though the intensity of the light beam incident on the analyzer 20, and the light absorption of the analyzer itself, varies over a wide range. For this reason, and because of the action of the regulator tube 216, the amplitude of the AC voltage of fundamental frequency appearing at the output of the pentode 236 is nearly directly proportional to the average angular rotation $\theta_0$ occurring in the polarimeter and is substantially independent of nay variations in sensitivity of the photomultiplier tube 24 or in the intensity of the radiaiton of the light source 12 or the absorption coefficient of the optical elements and of the sample. Thus, the ratio of the 60 c.p.s. component of AC output of the amplifier tube 236 to the deviation $\theta_0$ remains substantially constant even though samples are changed, the intensity of the light source changes, and even when the photomultiplier tube 24 is replaced.

In accordance with the invention described above, it is therefore possible to achieve accurate measurements of the angle of rotation provided by optically active liquids placed in a sample cell 40. Likewise, measurements may be made when the sample cell is filled with gas or when the sample cell is replaced by a solid sample.

In the embodiment of the invention illustrated in FIG. 3, the circuit of a current regulating system is shown for photosensitive element 24, which here is a photomultiplier tube of the type commercially identified as a 1P28 or 931-A type tube. An amplifier AF having two stages S1 and S2 is employed to amplify DC and low frequency signals and also to amplify 60 c.p.s. signals.

Figure 5:
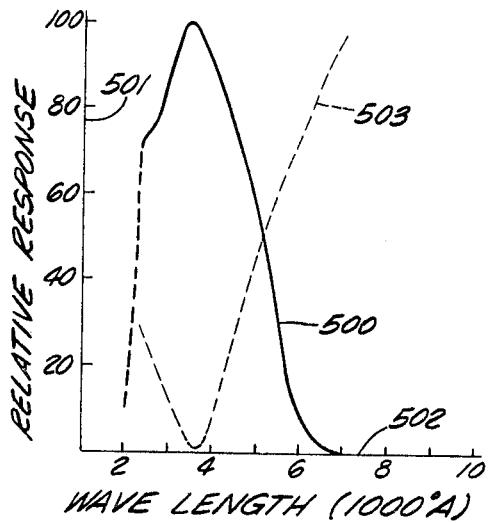
FIG. 5 is a graph of the spectral sensitivity of a photosensitive element such as used in this invention.

For the following discussion the 1P28 photomultiplier is used for illustrative purposes. The 1P28 tube has a spectral sensitivity known in the art as curve S-5 which is illustrated at 500 in the graph in FIG. 5. In the chart the ordinate scale 501 is graduated in percent of relative response with the peak response being 100%. The abscissa scale 502 represents wavelength over the visible and near-visible light spectrum from 2000 A. to 7000 A. With reference to FIG. 5, the relative response of the 1P28 has its peak at about 3500 A. in the ultraviolet (UV) region of the spectrum falling to about 70% at about 2200 A., a shorter wavelength further into the UV portion of the spectrum. At the longer wavelength end of the spectrum, at about 5000 A. the response is down 50%, falling to about 10% at about 6000 A. near the red end of the spectrum, there being practically no response in the infrared region.

In the absence of another factors which affect the response characteristics of the system in which the 1P28 type of photomultiplier is used for photosensitive element 24, a correction curve for improving the response thereof would approximate the dashed-line curve shown at 503. A correction characteristic very much like that indicated at 503 in FIG. 5 is obtained automatically from the circuits shown in FIGS. 2 and 3. Where the spectral sensitivity is high as at 3500 A. the gain G of the photomultiplier tube is low and where the spectral sensitivity is low as at 6000 A. the gain G is high. Perfect compensation is not necessary.

The first stage S1 of the amplifier AF amplifies DC compontnts, low frequency AC components, and 60 c.p.s. components and highly attenuates signals of other frequencies. This stage includes an amplifier tube 54 and a negative fe edback circuit including filter F1 and capacitor CV. The second stage S2 of the amplifier AF amplifies signals having components below some frequency between 60 c.p.s. and 120 c.p.s. The second stage S2 includes an amplifier tube 70 and a negative feedback circuit including filter F2.

In the arrangement of FIG. 3, the two stages S1 and S2 of DC amplification regulate the voltage in the output of the photomultiplier tube even more closely than the arrangement of FIG. 2. In this arrangement, a current regulator tube 50 having a cathode 41, control grid 42, screen grid 44 and anode 45, is connected in series with the positive terminal of a DC power supply 36. The cathode 41 of the regulator 50 is connected to ground at 29. The negative terminal 38 of power supply 36 is connected through a resistor 39 to cathode 25 of photomultiplier 24 which has the same elements therein as have previously been described in connection with FIG. 2 and these elements bear the same reference characters. A filter capacitor 35 is connected in parallel with voltage divider network 28 between cathode 25 and ground 29. Screen grid 44 of regulator 50 is connected at the junction of a voltage divider resistance network 47–48 and by-pass capacitor 49.

From anode 26 of photomultiplier 24 an anode load resistance 46 of substantial value (more than 100 megohms) is connected to ground at 29. Anode 26 is also connected through an isolation or current limiting resistor 59 to the control grid 58 of a DC amplifier tube 54 Cathode 57 of DC amplifier tube 54 is grounded at 29.

Screen grid 56 of amplifier tube 54 is connected to the junction of a voltage divider resistance network 51–52 and by-pass capacitor 53. An anode load resistance 60 is connected to anode 55 of DC amplifier 54. Resistors 52, 47 and 60 have a common connection to a junction point 62 to which a DC potential is supplied through resistor 64 from a source of +285 V.

The notch filter F1 is connected between anode 55 of amplifier 54 and anode 26 of photomultiplier 24. As previously described, notch filter F1 is a twin-T, R–C network which has a sharp attenuation characteristic at 60 c.p.s. so that signal components of all frequencies other than 60 c.p.s. are fed back to the input (grid 58) of amplifier tube 54 providing amplification in the first stage of the amplifier only at 60 c.p.s. and at DC and very low frequencies. The adjustable capacitor $C_V$ is a coupling capacitor which is appropriately adjusted sets the low frequency cutoff point of the feedback circuit so that at and near DC (or zero c.p.s.) the amplification level of amplifier 54 is greater than at points between the low frequency cutoff value set by capacitor $C_V$ and the notch frequency value of 60 c.p.s. The effect of this amplification characteristic is discussed below.

The second DC amplifier tube 70 has a grid 71, cathode 72, and anode 73. The grid 71 is connected through a resistor network to the anode 55 of amplifier tube 54.

The filter F2 is of a type in which an adjustable capacitor $C_x$ bridges a low-pass T section. This filter feeds back DC from the anode 73 to the grid 71 with a relatively low feedback ratio. This filter also feeds signal of frequencies above 60 c.p.s. with a relatively high feedback ratio. Thus, the stage S2 is effective for amplifying both DC and low frequency signals and also 60 c.p.s. signals received from stage S1.

The coupling between anode 55 of amplifier 54 and grid 71 of amplifier 70 is in the form of a DC path so that the combined effect of amplifier stages S1 and S2 is that of a stacked or tandem DC amplifier for the anode load current variations in anode load resistor 46 of photomultiplier 24.

Therefore, the greater the current in load resistor 46 of the photomultiplier tube, the greater the current in the anode load resistor 66 of amplifier tube 70 bringing anode 73 effectively closer to ground potential so that the DC potential at junction point 68 between resistors 67 and 69 connected between anode 73 and a source of negative potential at 65 becomes more negative with respect to ground, thereby applying greater negative bias on the control grid 42 of regulator 50 to decrease the current through voltage divider network 28 which results in a decrease in the voltage drop across each segment of the voltage divider 28 decreasing the dynode voltage in each stage of photomultiplier 24. In other words, the amplifier AF and regulator tube 50 cooperate to oppose any change in the level of the average current being generated by the photomultiplier tube 24.

Figure 4:
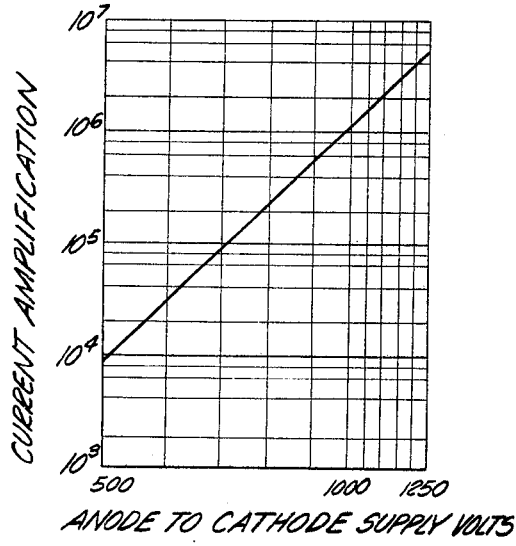
FIG. 4 is a graph of the current amplification of a photosensitive element such as used in this invention.

If reference is now made to the graph in FIG. 4 it may be seen that the current amplification of a photomultiplier tube such as the 1P28 tube increases rapidly when the potential between cathode and anode increases. The current amplification is logarithmic for uniform increments of dynode supply voltage. A small change in dynode voltage causes the same very large change in percentage gain regardless of the point of operation.

In the circuit of FIG. 3 the dynode supply voltage is applied across resistor 28. An increase in current through resistor 28 increases the dynode voltage supply. Accordingly, when the current in the anode load resistor 46 of photomultiplier 24 is reduced by small increments at DC or at low rate of change corresponding to frequencies near 0 c.p.s., that is, frequencies far below 60 c.p.s., small corrections are applied to the photomulplier supply regulator tube 50 to maintain a relatively linear response. Rapid fluctuations due to the 60 c.p.s. component in a light beam incident on cathode 25 are by-passed by the capacitor 35 across resistor 28 and by the RC filter network 33 between regulator control grid 42 and negative terminal 38 of DC power source 36.

With this arrangement, DC signals and components of the signal having a low frequency compared with 60 c.p.s. cause appropriate corrections of the current flowing through resistor 28 to occur to regulate the gain of the photomultiplier tube. In this regulation, the gain of the photomultiplier tube varies as an inverse function of the average light level incident on the photocathode 25 and as an inverse function of the sensitivity of the photocathode. The regulation is sufficiently high to cause the AC component of fundamental frequency appearing at the output of the photomultiplier tube and hence at the output of the measuring system 200 in FIG. 1 to be proportional to the fractional fluctuation of light intensity incident on the photocathode 25, even though the average intensity of the light incident on the photocathode and the sensitivity of the photocathode vary. Thus, over a wide spectral range and over a wide range of absorption coefficients of the sample, the average value of the current flowing through the photomultiplier tube is regulated to linearize the system. As a result, the amplitude of the output signal developed by the photomultiplier tube and by the measuring system 200 is made nearly proportional to the fractional change (at fundamental frequency) in the intensity of the beam incident on the photocathode. The amplitude of the AC signal is thus nearly proportional to the angular deviation of the mean position of the plane of polarization of the beam from the extinction position.

The filters 16 may be replaced from time to time in order to employ monochromatic radiation of different wavelengths for making of the measurements. In this way, data may be obtained which indicate how the optical activity or other polarization-rotation property of the sample varies as a function of wavelength.

Though the invention has been described above with reference to an application in which the monochromatic beam is formed by means of a source 12 generating a line spectrum and a filter 16 for selectively transmitting radiation in only one of the lines through the polarizer 18, it will be understood that other sources of monochromatic radiation may be used, and further that the wavelength of monochromatic radiation may be changed during the course of the readings and a record made of the reading of either the meter 300 or the meter 420 as a function of the wavelength of the monochromatic radiation in order to indicate how the output varies as a function of wavelength.

In the system illustrated in FIGS. 1 and 2 the constant of proportionality between the output reading and the rotation produced by the sample is substantially constant at any one wavelength, but varies from one wavelength to another. Hereafter the invention will refer to two different forms of spectropolarimeters in which the output reading is recorded as a function of the wavelength as the wavelength is changed. In both of these, the constant of proportionality is the same regardless of the wavelength, over a wide wavelength range.

Figure 7:
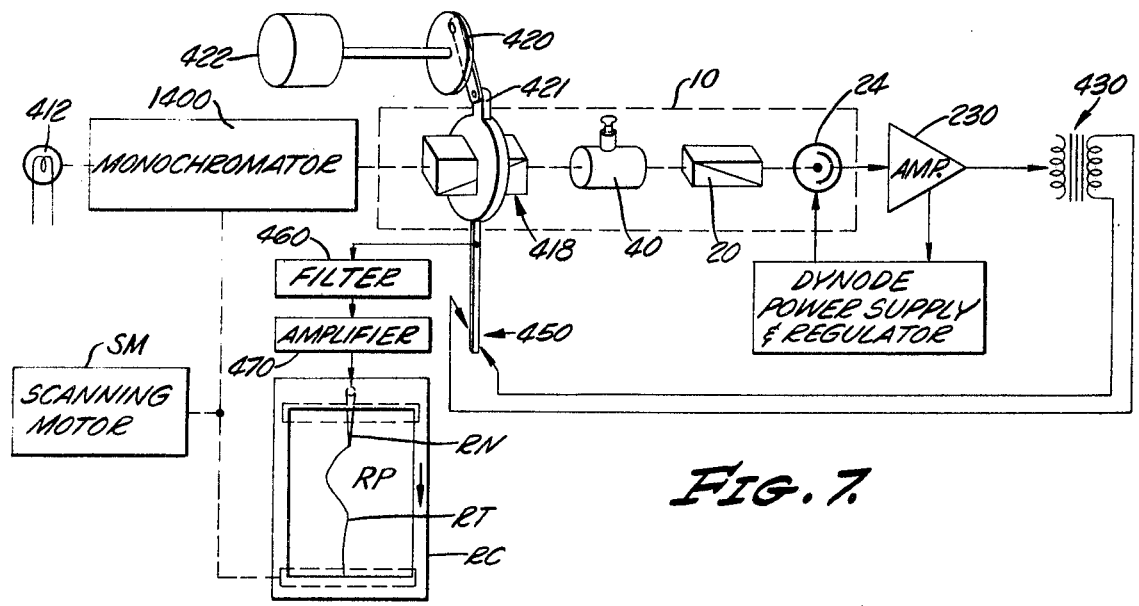
FIG. 7 is a diagram involving a part of the spectropolarimeter shown in FIG. 1 showing a polarization-plane oscillator.

In the application of the invention illustrated in FIG. 7, the radiation for the polarimeter is supplied by a monochromator 1400. The radiation for the monochromator is supplied from a lamp which emits a continuous spectrum over a wide range, such as from 2000 A. to 8000 A. The monochromator is operated continuously by means of a scanning motor SM which causes the wavelength of the radiation emitted from the monochromator and entering the polarimeter 10 to change continuously as a function of time. The scanning motor SM also operates a recorder RC which moves a strip of recording paper RP past a recording pen RN so as to produce a record trace RT which indicates how the rotation introduced by a sample varies as a function of wavelength.

In this case, the oscillation of the plane of polarization is produced by oscillating a polarizer 418 angularly by means of an eccentric 420 that is driven at constant speed by a motor 422. The eccentric 420 is connected through a simple linkage to an arm 421 extending from a rotatable housing in which the polarizer 418 is mounted. For convenience, it may be assumed that the motor is a 3600 r.p.m. synchronous motor so that the plane of polarization is oscillated at 60 c.p.s. as in the applications of the invention discussed above. The plane polarized beam emerging from the polarizer 418 and having an oscillating plane of polarization is transmitted through a sample cell 40 to an analyzer 20 to a photocell 24. The gain of the photocell is regulated in the manner hereinbefore described.

The output of the amplifier is fed through a transformer 430 to a synchronous rectifier 450 which is operated mechanically in synchronism with the oscillation of the polarizer 418. This synchronous operation may be obtained easily by mounting the output switch arm 452 of the synchronous rectifier on the oscillating housing 419 in which the polarizer 418 is mounted. The output of the synchronous rectifier is then fed through a filter 460 and if desired an amplifier 470 to the recording pen.

With this arrangement, the displacement of the trace RT from a zero position is proportional to the rotation introduced by the sample 40. The constant of proportionality is independent of wavelength.

Figure 8:
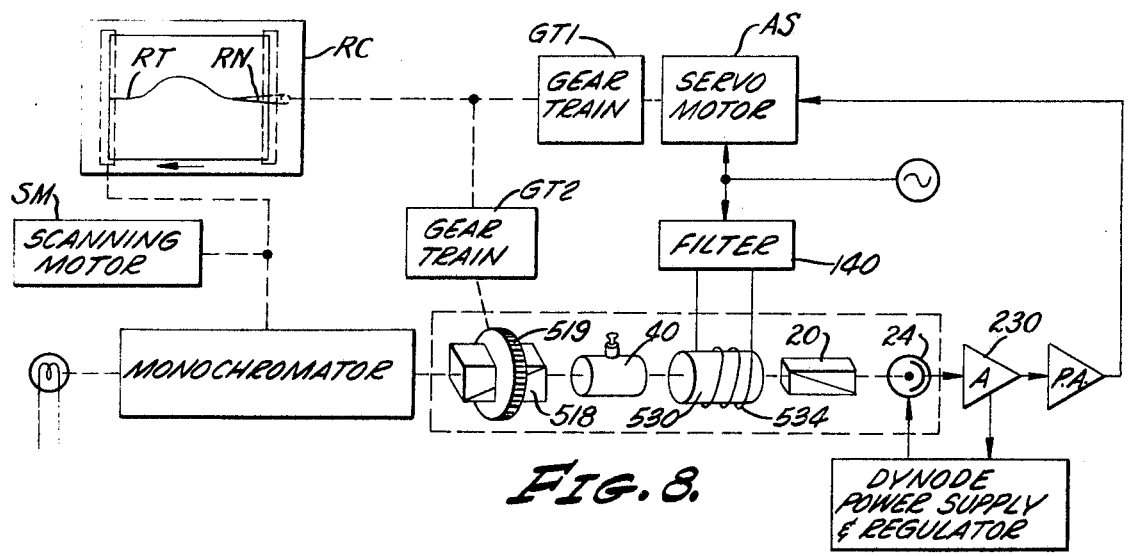
FIG. 8 is a detail of another polarization-plane oscillator.

In another application of the invention illustrated in FIG. 8, which is similar to that described in FIG. 7, the wavelength is also varied as a function of time and a recorder RC is operated by means of a scanning motor SM in order to produce a trace RT which indicates how the rotation produced by the sample varies as a function of wavelength. In this case, however, the polarizer 518 is rotatable but is not oscillated. Instead, the oscillation of the plane of polarization is produced by applying an alternating current to a Faraday coil 534. In this system, monochromatic radiation from the monochromator is directed into the polarizer 518; plane-polarized monochromatic radiation is then transmitted through the sample cell 40 and the Faraday cell 530 to the analyzer 20; and radiation passing through the analyzer impinges on the photocell 24. The current for the Faraday cell is supplied from the 60 c.p.s. power line through a 30 c.p.s. suppression filter 140 to cause the plane of polarization of the beam to oscillate at 60 c.p.s.

In this case, the 60 c.p.s. output of the amplifier 230 is employed to rotate the polarizer 518 automatically to such a position that the 60 c.p.s. output signal of the amplifier 230 is reduced to zero. In other words, in this case, the polarizer 518 is rotated automatically by the output of the amplifier to cause the mean position of the plane of polarization of the beam striking the analyzer 20 to be in its extinction condition, where the mean position of the plane of polarization of the beam is normal to the polarization plane of the analyzer 20. More particularly, the polarizer 518 is mounted in a rotatable housing 519 which is driven through gear trains GT1 and GT2 by a servomotor AS that is driven by a power amplifier PA connected to the output of the 60 c.p.s. amplifier 230. The servomotor also operates the recording pen RN through the gear train GT1, so that the displacement of the pen on the recording paper is always proportional to the rotation of the plane of polarization produced by the sample in the sample cell 40—the constant of proportionality between the pen position and the polarization rotation being substantially independent of wavelength.

Figure 9:
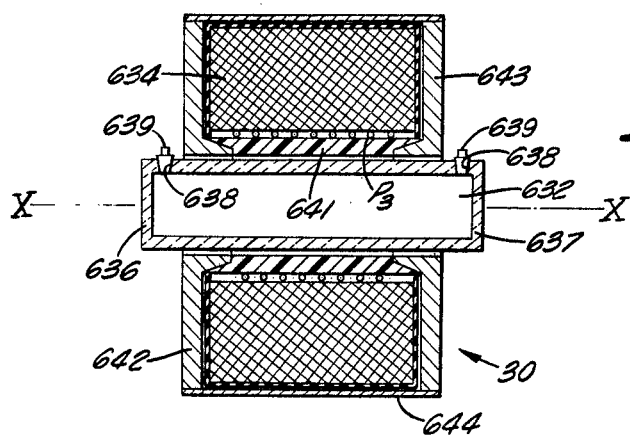
FIG. 9 is a detailed cross-section of a Faraday cell.

A Faraday cell 30 of the type suitable for use in various forms of this invention is illustrated in FIG. 9. This cell includes a tubular container having two end walls 636 and 637, each of which has flat parallel surfaces. The two end walls 636 and 637 are parallel to each other. The end walls are composed of annealed fused silica which is free of any substantial strains and is therefore substantially isotropic, thereby avoiding the introduction of any birefringent effects. Filler ports 638 and stoppers 639 are provided in the upper part of the vessel 632 at the ends thereof to facilitate the introduction and removal of a liquid exhibiting a suitable Verdet constant characteristic.

The Faraday coil 634 consists of a winding of insulated copper wire wound on a bobbin or spool-shaped holder having a central tubular base 641, a pair of iron end bells or flanges 642 and 643 and an outer cylindrical soft iron shroud 644. The end bells 642 and 643 and the shroud 644 provide an external magnetic case which provides a low-reluctance path which makes it possible to produce a magnetic field of substantial strength in the vessel 632 along the axis X—X without creating large magnetic fields at the sample cell 40 and at the phototube 24. In other words, the iron housing formed by the end bells 642 and 643 and the shroud 644 serve to increase the magnetic field in the Faraday cell, but at the same time, in effect, shield the sample cell and the photocell from the magnetic field produced in the Faraday cell.

In the applications of the invention particularly described above, the sample cell 40 has been described as one which is specifically adapted for measuring the optical activity of a liquid. It will be understood, however, that the sample cell 40 may be in the form of a Faraday cell of the type illustrated in FIG. 9 and that, in this case, by applying only direct current to the Faraday coil 634 associated with the sample cell, measurements may be made of the optical rotation produced in the sample because of the Verdet constant characteristics of the sample.

All forms of the invention described involve self-balancing. In the system of FIG. 1 the polarization rotation produced by the specimen is compensated by the DC current applied to the coil 34. This current, which is measured on the meter 420 is proportional to the polarization rotation angle at the wavelength under investigation. It therefore varies from one wavelength to another inversely as the Verdet constant. In the systems represented in FIGS. 7 and 8, the compensation for rotation produced by the sample is produced mechanically. In these forms of the invention, the angle of rotation is indicated by the displacement of a recording pen RN. In this case, the output signal, that is, the displacement of the recording pen is proportional to the rotation angle at all wavelengths and is independent of Verdet constant. The regulation of the gain of the photomultiplier element makes it possible for all of these systems to operate over a wide range of input signal, over a wider range of sample absorbance, and over a wide range of wavelengths.

Various changes which will now suggest themselves to those skilled in the art may be made in the material, form, details of construction and arrangement of the elements without departing from the scope of the invention. More particularly, it will be understood that the invention is not limited to the measurement of the optical rotation produced by liquid substances but that it may also be employed to determine the optical activity of gasses and solids. Furthermore, the invention may be applied by use of other types of polarizing and analyzing means and by means of other types of photocells and with other types of measuring devices.

It will also be understood that this invention may be applied to the measurement of other optical properties of specimens in which a plane of polarization is rotated by differing amounts as the wavelength of the radiation is changed. While the invention has been described particularly with reference to the measurement of optical activity and the Faraday effect, it may be employed in the measurement of other effects such as the Kerr effect, the Cotton-Mouton effect and other optical polarization properties of matter. Furthermore, while the invention has been described in connection with the effects of specimens on light transmitted therethrough, it will also be understood that it may be applied to variations in rotation of polarized light, that is reflected or refracted by a sample. Accordingly, it will be understood that the invention may be embodied in many other forms and applied in many other ways.

The invention claimed is:
1. In combination:
Faraday cell means arranged on an optical path and including Faraday coil means for establishing a magnetic field along said optical path;
means for projecting a beam of plane-polarized monochromatic light along said optical path;
a holder for supporting on said optical path a sample that rotates the plane of polarization of said beam in accordance with the optical activity of the sample;
polarization-sensitive means including a photomultiplier tube located on said path for receiving the beam leaving the sample to produce an electric signal having an amplitude that varies in accordance with the magnitude of the vector component of the electric vector of the beam that extends in a predetermined direction normal to the optical axis:

an amplifier connected to said photomultiplier tube for amplifying AC components of said electric signal;

said amplifier being selectively responsive to a frequency component of said signal of a predetermined fundamental frequency;

means including a source of direct current for supplying a direct current to said Faraday coil means for rotating said plane of polarization through an average angle of rotation, corresponding to the magnitude of said direct current as said beam is transmitted through said Faraday cell, such that in the resulting average angular position the plane of polarization of the beam is about normal to said vector component direction;

means for suplying alternating current of said predetermined fundamental frequency to said Faraday coil means for causing the plane of polarization of the beam received by said polarization-sensitive means to oscillate about the average position determined by said direct curent; and means controlled by a component of the output current of said photomultiplier tube other than the component of said fundamental frequency for automatically varying the current gain of said photomultiplier tube to compensate for fluctuation in intensity of said beam and for variations in sensitivity of said photomultiplier tube, whereby the magnitude of the fundamental frequency component of said output current varies as a function of said deviation angle substantially independently of such fluctuations and variations.

2. In the combination defined in claim 1, means controlled by the output of said amplifier for regulating the magnitude of the dircet current supplied to said Faraday coil means to compensate for the average rotation of the plane of polarization produced by the sample.

3. In a polarimeter:

means for projecting a beam of plane-polarized monochromatic light along an optical path to a sample that rotates the plane of polarization of said beam;

means for causing the plane of polarization of said beam to oscillate about a mean position after leaving the sample;

polarization-sensitive means including a photosensitive element located on said path and responsive to the oscillating beam leaving the sample for producing an electric signal having an amplitude that varies in accordance with (1) the magnitude of the vector component of the electric vector of the beam that lies in a predetermined direction normal to the optical axis, said magnitude being dependent (a) on the deviation of the means position of the plane of polarization of the beam from said predetermined direction, (b) and on the intensity of the beam leaving the sample;

(2) the sensitivity of the photosensitive element, and (3) the gain of said photosensitive element, said electric signal having a DC component and AC components, an amplifier connected to said photosensitive element for amplifying such AC components of the signal developed by said photosensitive element in response to changes in magnitude of said vector component;

means controlled by the direct current output of said photosensitive element for automatically varying the gain thereof to compensate for variations in sensitivity thereof and in the average intensity of said beam, whereby the amplitude of said output current varies as a function of said deviation angle substantially independently of such variations in intensity of said beam and in the gain and sensitivity of said photosensitive element; and means controlled by the said AC component for indicating the amount of rotation produced by such sample at the wavelength of said monochromatic light.

4. A polarimeter as defined in claim 3 comprising:

means controlled by the output of said amplifier for rotating the plane of polarization of said beam in such a direction and amount as to substantially compensate for the rotation caused by the sample.

5. In a polarimeter:

means for projecting a beam of plane-polarized monochromatic light along an optical path to a sample that rotates the plane of polarization of said beam;

means for causing the plane of polarization of said beam to oscillate angularly at a fundamental frequency about a mean position after leaving the sample;

polarization-sensitive means including a photosensitive element located on said path and responsive to the light beam leaving the sample for producing an electric signal having an amplitude that varies in accordance with (1) the amplitude of oscillation of the polarization plane of the beam, (2) the deviation of the mean position of the plane of polarization of the beam from a crossed condition, (3) the sensitivity and the gain of the photosensitive element, and (4) the intensity of the beam leaving the sample;

a signal amplifier connected to said photosensitive element for amplifying AC components of said fundamental frequency in the signal developed by said photosensitive element in response to the light beam;

regulating means controlled by the direct current component of the output of said photosensitive element for automatically varying the gain thereof to compensate for variations in average intensity of said beam and for variations in sensitivity of said photosensitive element, whereby the magnitude of the fundamental frequency component of said output current varies as a function of said deviation angle substantially independently of such variations; and measuring means controlled by the AC output of said amplifier for indicating the amount of rotation produced by such sample at the wavelength of said monochromatic light.

6. A polarimeter as defined in claim 5 wherein:

said pohotosensitive element is a photomultiplier tube;

such regulating means comprises a power source for energizing said photomultiplier tube and a current regulator for said power source; and said control means being responsive to the current output of said photomultiplier tube for operating said current regulator to regulate the gain of said photomultiplier tube.

7. A polarimeter as defined in claim 6 wherein:

said photosensitive element comprises a photomultiplier tube having dynodes, a cathode, and an anode;

said regulating means comprises a photmultiplier anode load impedance means connected to a source of biasing potential;

said signal amplifier has an input circuit and both a DC output circuit and an AC output circuit, said input circuit being connected across said anode load impedance means and being responsive to the bias levels of said biasing potential to develop a corresponding DC current in said DC output circuit;

said DC output current varying as a function of said biasing potential and the average current in said anode load impedance means;

a source of direct current potential having negative and positive output terminals, the negative terminal thereof being connected to the cathode of said photomultiplier;

a current regulating amplifier having at least first, second and third electrodes, said second electrode being a control electrode that controls the current flowing through said first and third electrodes, said first electrode being connected to a point of reference potential, said third electrode being connected to said positive terminal of said source of direct current potential, said control electrode being connected to said DC output circuit of said signal amplifier;

a tapped voltage divider network interconnected between said cathode of said photomultiplier and said point of reference potential, the taps thereof being connected to respective dynodes of said photomultiplier detector;

said measuring means being connected to said AC output circuit.

8. A polarimeter as defined in claim 7 comprising:

means controlled by the output of said signal amplifier for rotating the plane of polarization of said beam in such a direction and amount as to substantially compensate for the rotation caused by the sample at the wavelength of said monochromatic light.

9. In a polarimeter:

means for projecting a beam of plane-polarized monochromatic light along an optical path to a sample that rotates the plane of polarization of said beam;

means for causing the plane of polarization of said beam to oscillate about a mean position after leaving the sample;

polarization-sensitive means including a photosensitive element located on said path and an amplifier operated by said photosensitive element, responsive to the light beam leaving the sample for producing at the output of said amplier a signal having a magnitude that varies as a function of time in accordance with variations in the magnitude of the vector component of the electric vector of the beam that lies in a predetermined direction normal to the optical axis;

regulating means controlled by the average current output of said photosensitive element for automatically varying a characteristic of said polarization sensitive means to compensate for variations in average intensity of said beam and for variations in sensitivity of said photosensitive element, whereby the amplitude of variation of said output signal varies as a function of the magnitude of said vector component of said beam substantially independently of such variation in intensity and sensitivity; and measuring means controlled by the output of said amplifier for indicating the amount of rotation produced by such sample at the wavelength of said monochromatic light.

10. In a polarimeter in which a beam of monochromatic polarized light is transmitted along an optical path to a sample under analysis, which sample rotates the plane of polarization of said beam, and to polarization sensitive means including a photosensitive current amplifying element for producing a electric current varying in magnitude with the angle of rotation of said beam due to said sample and in which the polarization plane is oscillated about a mean position and further in which said polarization plane is urged toward a crossed condition relative to a polarization axis of said polarization sensitive means by means of a polarization-plane rotating control element and including a system for generating an alternating current in accordance with the magnitude of the deviation of the mean plane of polarization of said beam from a crossed condition at said photosensitive element, said system comprising:

a power source for said photosensitive element including a current regulator for said power source;

amplifying means coupled to said photosensitive element;

first means in said amplifying means responsive to the average current flowing in said photosensitive element for applying a regulating signal to said regulator to vary the gain of said photosensitive element as an inverse function of said average current to regulate said average current at a predetermined level; and second means in said amplifying means for developing an alternating current signal having an amplitude dependent upon the average deviation of the angle of rotation of said beam from such crossed condition for operating said control element.

11. In an apparatus for measuring and indicating a polarization characteristic:

means for generating a monochromatic, polarized light beam;

means defining a volume disposed for passage therethrough of said beam, and adapted to enclose and support a specimen to intercept said beam;

means disposed to receive said beam leaving said volume after such interception, and adapted to produce an electrical signal in correspondence with polarization characteristics of said beam;

means responsive to said electrical signal for producing an indication of changes induced in one such polarization characteristic, by such interception and passage through said volume; and means responsive to said electrical signal for regulating the gain of said receiving and producing means to maintain a component of said signal near a predetermined amplitude;

whereby said indication is rendered substantially independent of (1) spurious influence due to variations in the intensity of said beam at said volume, and (2) spurious influence due to variations in sensitivity of said receiving and generating means.

12. In a polarimetric apparatus:

means for generating a monochromatic plane-polarized, light beam;

means defining a volume disposed for passage of said beam therethrough, and adapted to receive a specimen for intercepting said beam;

means including photosensitive element disposed to receive said beam after leaving said specimen, said means being responsive to a polarization characteristic of said received beam and adapted to generate an electrical signal in correspondence therewith;

means responsive to said electrical signal for indicating the amount of rotation of the plane of polarization of said beam caused by such a specimen in said volume;

means responsive to said electrical signal for regulating the gain of said receiving and generating means to maintain said indicated rotation at the wavelength of said monochromatic light beam independent of spurious influences due to variations in the intensity of said beam emerging from said volume and due to variations in sensitivity of said receiving and generating means.

13. In apparatus as defined in claim 12, a load circuit, said photosensitive element comprises a photomultiplier tube connected to develop said electric current in said load circuit, said first responsive means including filtering means connected to said load resistor for selecting an AC component of said signal that varies in accordance with said amount of rotation and means controlled by said AC component for indicating the amount of rotation;

said second responsive means including filtering means connected to said load circuit for developing a DC signal to provide the regulation.

References Cited

UNITED STATES PATENTS

| | | |
|---|---|---|
| 2,474,098 | 6/1949 | Dimmick. |
| 2,583,143 | 1/1952 | Glick. |
| 2,743,374 | 4/1956 | McCreary. |
| 2,868,060 | 1/1959 | Akerman et al. |
| 2,933,972 | 4/1960 | Wenking. |
| 2,974,561 | 3/1961 | Hardy et al. |
| 3,230,820 | 1/1966 | Wisnieff. |

RONALD L. WIBERT, Primary Examiner

T. R. MOHR, Assistant Examiner

U.S. Cl. X.R.

356—114, 116